United States Patent [19]  [11] Patent Number: 4,703,071
Owens  [45] Date of Patent: Oct. 27, 1987

[54] STABILIZED AQUEOUS COATINGS CONTAINING ZINC OXIDE

[75] Inventor: Phillip M. Owens, Strongsville, Ohio

[73] Assignee: The Glidden Company, Cleveland, Ohio

[21] Appl. No.: 823,070

[22] Filed: Jan. 27, 1986

[51] Int. Cl.$^4$ ................................................ C08K 3/22
[52] U.S. Cl. .................................... 523/403; 523/404; 523/407; 523/408; 428/418
[58] Field of Search ............... 523/403, 404, 407, 408, 523/459; 428/418

[56] References Cited

U.S. PATENT DOCUMENTS

| | | | |
|---|---|---|---|
| 4,213,781 | 7/1980 | Evans et al. | 523/403 |
| 4,285,847 | 8/1981 | Ting | 524/458 |
| 4,487,861 | 12/1984 | Winner | 523/404 |
| 4,503,173 | 3/1985 | Martino et al. | 523/403 |
| 4,522,961 | 6/1985 | Martino et al. | 523/403 |

*Primary Examiner*—Lewis T. Jacobs
*Attorney, Agent, or Firm*—Thomas M. Schmitz

[57] ABSTRACT

Single package C-enamel can coatings of improved stability are prepared by first dispersing the zinc oxide pigment in a water compatible solvent containing a butylated urea formaldehyde or butylated melamine and adding the dispersed pigment to a vehicle comprising an aqueous blend of an epoxy-acrylic emulsion with an acrylic latex. The stability improvement is evident in the coating viscosity, the non-settling of the pigment on storage, and the flexibility adhesion in the applied coating.

5 Claims, No Drawings

4,703,071

STABILIZED AQUEOUS COATINGS CONTAINING ZINC OXIDE

This invention relates to aqueous-based one-package C-enamels having improved stability and to metal cans coated therewith.

BACKGROUND OF THE INVENTION

In the can industry, coatings containing ZnO have been used for many years to "hide" sulfide staining caused by certain foods during processing and storage cycles (corn, peas, fish, meat products all containing high contents of sulfide proteins). The ZnO usually incorporated at a level between 5%-20% on total coating solids, protects the tinplate (normally more susceptible to staining than tin free steel, also used in can production) by forming white ZnS rather than the more objectionable brown-black tin sulfide.

Traditional solvent-based C-enamels are normally two-package systems consisting of the clear vehicle in one package and the ZnO paste in the other. Zinc oxide is considered a "reactive" pigment. Zinc oxide, and in particular $zinc^{++}$ ions have a relatively strong tendency to coordinate or bind with certain ligands and acid or "basic" materials. Zinc oxide can form "zinc soaps" with certain types of resin vehicles with acid functionality. The zinc soap causes a gel-like structure to form in the coating producing an unusable material after a time. The traditional solvent-based C-enamels which used vehicles with low acid value (oleoresinous with low acid, epoxy with no acid, etc.) have less potential problems with instability than in water-borne systems, which usually contain a high degree of acid functionality.

In water-based C-enamels (those containing zinc oxide pigment) stability has been a major problem resulting in viscosity buildup, pigment or resin settling and loss of flexibility and adhesion. Heretofore, stability of single-package or two-package water-based C-enamel was poor. When the resin vehicle is a typical epoxy-acrylic type with acid number of about 50 to 80 (as described in U.S. Pat. Nos. 4,285,847 and 4,212,781), there is only limited stability. These disadvantages have been overcome by the instant invention which provides a single package-C enamel having excellent stability characteristics.

BRIEF DESCRIPTION OF THE INVENTION

The invention pertains to stable aqueous zinc oxide coatings (C-enamels) useful for coating metal substrate which comprises a blend of (a) a dispersion of zinc oxide pigment in a water miscible solvent, preferably an alcohol such as butanol, containing a stabilizing amount of a dispersant selected from the group consisting of alkylated urea formaldehyde resin or alkylated melamine resin wherein a major portion of the alkyl groups of said resin are alkyl groups having four or more carbon atoms and preferably from 4 to 10 carbon atoms; and (b) an aqueous mixture of epoxy-acrylic resin prepared by polymerization in an organic solvent with an acrylic latex prepared by polymerization in an aqueous medium.

A further aspect relates to a process for preparing the above C-enamels wherein the zinc oxide/dispersant weight ratios are from about 1.2:1 to 2:1 and the resin vehicle blend of epoxy-acrylic emulsion contains up to 50 weight percent (basis resin solids) of acrylic latex.

A still further aspect relates to a metal can coated with abovedescribed C-enamels.

DETAILED DESCRIPTION OF THE INVENTION

An improved stability single package, water-based spray-C enamel is made by using as major resin vehicle a blend of an epoxy-acrylic emulsion having a relatively high acid number as described in U.S. Pat. No. 4,285,847 and a lower acid functional acrylic latex (approximately 33 acid number) as described in U.S. Pat. No. 4,503,173. Both patents are incorporated herein by reference. While not wishing to be held to any particular theory, it is believed the instant coatings provide greater stability by diminishing the availability of the overall acid content. Although the polymer blend may vary widely over the range of 50 to 80 percent epoxy acrylic to 50 to 20 percent acrylic latex (solids basis), a preferred ratio of about 50/50 epoxy acrylic/acrylic provides optimum (1) film flexibility, (2) food process resistance, and (3) optimum spray characteristics.

In addition to proper choice and balance of resin in the blend, the preparation of the zinc oxide paste is important for overall stability and for maintaining film properties including flexibility. Using a melamine formaldehyde resin such as Cymel 303, a preferred crosslinker in clear systems, a relatively stable system is formed. However, a butylated urea formaldehyde resin such as Beetle 80 (both products from American Cyanamid) provide excellent stability. Differences in pigment "flocculating character" can be detected. When the coating is baked, the pigment may take on a different appearance in the film on aging. Sometimes the appearance is one like a "Benard" cell type configuration (hexagonal in structure) or one looking like pigment agglomeration. Direct correlations can be drawn between such pigment agglomeration and film flexibility.

Using a butylated urea formaldehyde resin as dispersant for the zinc oxide, a single package C-enamel exhibits good sprayability with little or no change in flexibility or film appearance (pigment appearance in particular after several months). The butylated urea is preferred over the melamine because of the slower "cure" reaction with the epoxy/acrylic/acrylic latex vehicle and flexible films are produced in contrast to overly crosslinked (embrittled) coatings where the cure is not moderated.

The butylated urea-formaldehyde resins apparently function as good dispersants for zinc oxide due to (1) nitrogen "attachment" to wet the ZnO, and (2) hydrophobic butylation surrounding ZnO to minimize $H_2O/H_2O$ soluble resin interaction with ZnO.

BUTYLATED UREA-FORMALDEHYDE TYPE RESIN

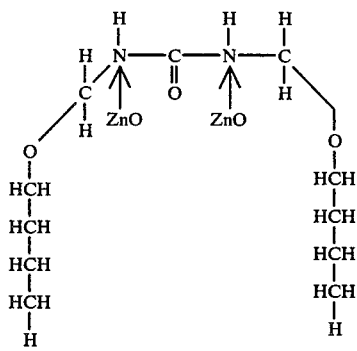

Various ratios of zinc oxide to crosslinker over the range 2:1 to 1.5:1 can be used in the instant invention. A weight ratio of 2.0 parts zinc oxide to 1 part ratio of butylated urea-formaldehyde resin is preferred. It is contemplated that while the highly alkylated ($C_4$ and above) urea formaldehyde resin and melamine resins are the dispersants of choice, appropriate mixtures of lower alkylated and non-alkylated resins with high alkylated ($C_4$ and above) resins will also be satisfactory for dispersing the zinc oxide pigments and providing single package C-enamel stability. Such dispersants or mixtures will include, for example, butoxy methyl glycoluril (Cymel 1170); ethoxymethoxy benzoguanamine (Cymel 1123); butoxymethyl urea (Beetle 80); hexakis-methoxymethyl melamine (Cymel 303); hexabutoxymethyl melamine (Cymel 1152); methylated melamine formaldehyde resin (Cymel 325); butylated melamine formaldehyde resin (Cymel 1158); and the like.

The following illustrative Examples should not be narrowly construed. Unless otherwise indicated, parts and percentages are by weight, and temperature is given in degrees Centigrade.

EXAMPLE 1

Comparative C-Enamel

A water-based C-enamel is made from an epoxy-acrylic emulsion as described in U.S. Pat. No. 4,285,847. The epoxy-acrylic emulsion with a 70:30 epoxy-acrylic ratio (but can be an 80:20, 60:40, etc., epoxy-acrylic ratio, as these emulsions show similar behavior), is made by reacting acrylic monomers onto an epoxy of molecular weight approximately 3,600, under such conditions that acrylic polymer is in part grafted (through free radical abstraction of an epoxy hydrogen and addition of unsaturated acrylic monomer/polymer to the epoxy backbone) to the epoxy.

Benzoyl peroxide at rather high levels on acrylic monomers (5%-10%) is typically used to obtain such grafting. Incorporation of an unsaturated carboxylic acid containing monomer like methacrylic acid in the acrylic composition enables the acrylic polymer (grafted as well as free acrylic) to emulsify the hydrophobic epoxy resin. In this particular case an emulsion consisting of 70% epoxy (~3,600 molecular weight), 13% methacrylic acid, 14% styrene, 3% ethyl acrylate, having an acid number of 85 is used. The epoxy-acrylic resin is polymerized at ~70% solids in butanol and Butyl Cellosolve solvents at ~1:1 ratio of butanol/Butyl Cellosolve, and is neutralized with dimethyl ethanolamine to make a water emulsion. This epoxy-acrylic emulsion is at ~30% solids in the examples below, at ~50% neutralization with dimethyl ethanolamine.

Two C-enamels made with the same epoxy-acrylic emulsion are described below. One C-enamel uses a paste made from a ZnO/methylated melamine grind the other from a ZnO/butylated urea resin grind.

| ZnO Grind "A" | | ZnO Grind "B" | |
|---|---|---|---|
| Beetle 80* | 900 | Cymel 303** | 900 |
| Butanol | 1,490 | Butanol | 1,490 |
| ZnO | 2,452 | ZnO | 2,452 |

*American Cyanamide Butylated Urea
**Methylated Melamine

The ZnO pigment grinds are made first by making a Cowles predispersion followed by a sandmill grind to a 7-8 Hegman grind.

| Ingredient | A | B |
|---|---|---|
| *Epoxy-Acrylic Emulsion | 300 | 300 |
| Deionized Water | 122 | 122 |
| Dimethyl Ethanolamine | 3.5 | 3.5 |
| Butanol | 22 | 22 |
| Cymel 303 | 5 | 5 |
| **Phenodur PR-307 | 5 | 5 |
| Butyl Cellosolve | 5 | 5 |
| 25% Carnauba Wax Emulsion | 2 | 2 |
| ZnO Grind "A" | 43 | — |
| Zno Grind "B" | — | 43 |
| % Solids | ~24 | ~24 |
| Viscosity #4 Ford | 50 seconds | 50 seconds |
| % ZnO on Total Solids | ~16.5% | ~16.5% |

*30% solids 70:30 epoxy/acrylic emulsion having ~85 acid number.
**Low Molecular Weight Gold Colorant Phenolic at 65% solids.

Initial evaluation of "A" and "B" shows both having ~ the same flexibility, which is ~50% Wedge Bend Failure with a 5-6 mg./sq. inch film. After lestt than 24 hours after preparation, "B" begins to show (1) worse flexibility of ~75%-100% failure, (2) a reduction in viscosity to about 30 seconds, and (3) a grainy appearance due to pigment flocculation. While "A" also shows somewhat similar results, the flexibility does not worsen quite as much and as quickly. Both "A" and "B" eventually show heavy pigment settling, which makes the material unsuitable for usage, as well as the reduced viscosity making the spray application less satisfactory. These C-enamels even when the ratio of ZnO to Beetle 80 is increased to a weight ratio of from 2:1–1.5:1 still result in instability as evidenced by heavy pigment settling.

EXAMPLES 2-4

Preparation of Epoxy/Acrylic—Latex C-Enamel

C-enamels were prepared using a blend of the above-described epoxy-acrylic emulsion with an acrylic latex having a lower acid number (~33) than the epoxy-acrylic emulsion. The acrylic latex was prepared as described in U.S. Pat. No. 4,503,173 and contains 50% styrene/40% ethyl acrylate, 5% methacrylic acid/5% N-isobutoxy methylolacrylamide. Particle size of latex is ~3,000–4,000 Å.

Pigment grinds were prepared by first making a Cowles predispersion followed by sandmilling to a 7–8 Hegman grind as follows:

| | Beetle 80 | Butanol | Zinc Oxide |
|---|---|---|---|
| Example 2 | 900 | 1,490 | 2,452 |

-continued

|  | Beetle 80 | Butanol | Zinc Oxide |
|---|---|---|---|
| Example 3 | 1,226 | 1,836 | 2,452 |
| Example 4 | 1,635 | 1,845 | 2,452 |

C-enamels were formulated at the same pigment level (total solids) and the same initial #4 Ford Cup viscosities:

|  | Example Nos. | | |
|---|---|---|---|
| Ingredient | 2 | 3 | 4 |
| Acrylic Latex (44% solids) | 5,390 | 5,390 | 5,390 |
| Deionized H₂O | 6,160 | 6,160 | 6,160 |
| Dimethyl ethanolamine | 185 | 185 | 185 |
| Butanol | 1,294 | 1,294 | 1,294 |
| Epoxy-Acrylic Emulsion (23% solids) | 10,350 | 10,350 | 10,350 |
| Cymel 303 | 539 | 539 | 539 |
| Phenodur PR-307 | 431 | 431 | 431 |
| Butyl Cellosolve | 431 | 431 | 431 |
| Carnauba Wax Emulsion (25% solids) | 156 | 156 | 156 |
| Zinc Oxide Grind "A" | 2,258 | — | — |
| Zinc Oxide Grind "B" | — | 2,618 | — |
| Zinc Oxide Grind "C" | — | — | 2,868 |
| Deionized Water | 300 | 500 | 800 |
| % NV | ~24% | ~24% | ~24% |
| Viscosity #4 Ford | 54 secs. | 57 secs. | 53 secs. |

The #4 Ford cup viscosities of "A", "B", and "C" represent the viscosity of each sample taken directly after the sample had experienced mixing. After sitting for 1½ hours, the viscosities of each were taken by an LVT Brookfield viscometer at various spindle speeds. Then, after 24 hours, the same Brookfield viscosities were taken on the samples without mixing the samples. The bodying or thixotropic character is evident with each sample on standing, but shows the least thixotropic character with the ZnO grind containing more Beetle 80.

|  | Example 2 (cps) | Example 3 (cps) | Example 4 (cps) |
|---|---|---|---|
| Initial Brookfield Viscosity (LVT, Spindle #3) - (RPM) | | | |
| 12 | 950 | 750 | 620 |
| 30 | 712 | 584 | 512 |
| 60 | 560 | 482 | 424 |
| Brookfield Viscosity After 24 Hour Standing - (RPM) | | | |
| 12 | 1,800 | 1,430 | 700 |
| 30 | 1,120 | 972 | 552 |
| 60 | 808 | 716 | 442 |

Both "A" and "C" are equally good for spray application after a month's aging and show no pigment settling. "A" requires moderate mixing just prior to spray to provide a material with a more "homogeneous" viscosity. By using a 50/50 ratio of latex/epoxy-acrylic solids and various Beetle 80 ZnO pastes (varying ZnO/Beetle 80 ratios), "stable" C-enamels with varying degrees of thixotropy were obtained. The C-enamels are stable up to 1-2 months after preparation—showing little change in flexibility, no pigment settling, and as good spray application as when sample was fresh. The thixotropic character is beneficial to some extent in spray application, as it prevents excessive draping which would result in blisters in the bottom portion of a sprayed can. However, a material with too much thixotropy may require some mixing to give a more homogeneous material prior to spraying.

These above coatings were sprayed on 303×406 Drawn and Ironed Tinplate cans with ~230 mgs. of dry coating/per can. The coating baked at 3.5 minutes @ 400° F. Peak Metal Temperature showed good sulfide stain resistance after being processed with such foods as corn, peas, green beans (processing 45-90 minutes at 240° F. to 250° F.).

EXAMPLE 5

When the procedure of Examples 2, 3, and 4 were repeated using Cymel 1156 in place of the Beetle 80 dispersant equally, good grinds and coatings were obtained.

What is claimed is:

1. A stable aqueous single package C-enamel useful for coating metal substrate which comprises a blend of
   (a) a dispersion of zinc oxide pigment in an alcohol solvent containing a stabilizing amount of a dispersant selected from the group consisting of alkylated urea formaldehyde resin or alkylated melamine resin wherein a major portion of the alkyl groups of said resin are butyl groups or higher alkyl groups; and
   (b) an aqueous mixture of epoxy-acrylic resin prepared by solvent polymerization with an acrylic latex resin prepared by polymerization in an aqueous medium.

2. The C-enamel of claim 1 wherein said dispersant is butylated urea formaldehyde.

3. The C-enamel of claim 2 wherein the zinc oxide/dispersant weight ratio is from about 2:1 to about 1.5:1 and the solids weight percent ratio of epoxy-acrylic emulsion to acrylic latex is 50:50.

4. A process for preparing a stable aqueous C-enamel useful for coating metal can which comprises
   (a) first dispersing a zinc oxide pigment in a water miscible solvent containing a stabilizing amount of a dispersant selected from the group consisting of alkylated urea formaldehyde resin or alkylated melamine resin wherein said alkylation is provided by a major amount of butyl groups or high alkyl groups;
   (b) milling said dispersed pigment to form a pigment grind; and
   (c) combining the pigment grind containing dispersed pigment with a vehicle comprising an aqueous blend of epoxy-acrylic resin prepared by solvent polymerization with an acrylic latex resin prepared by emulsion polymerization in an aqueous medium.

5. The process of claim 4 wherein the zinc oxide is dispersed in butanol containing a butylated urea formaldehyde resin dispersant.

* * * * *